United States Patent Office 3,834,912
Patented Sept. 10, 1974

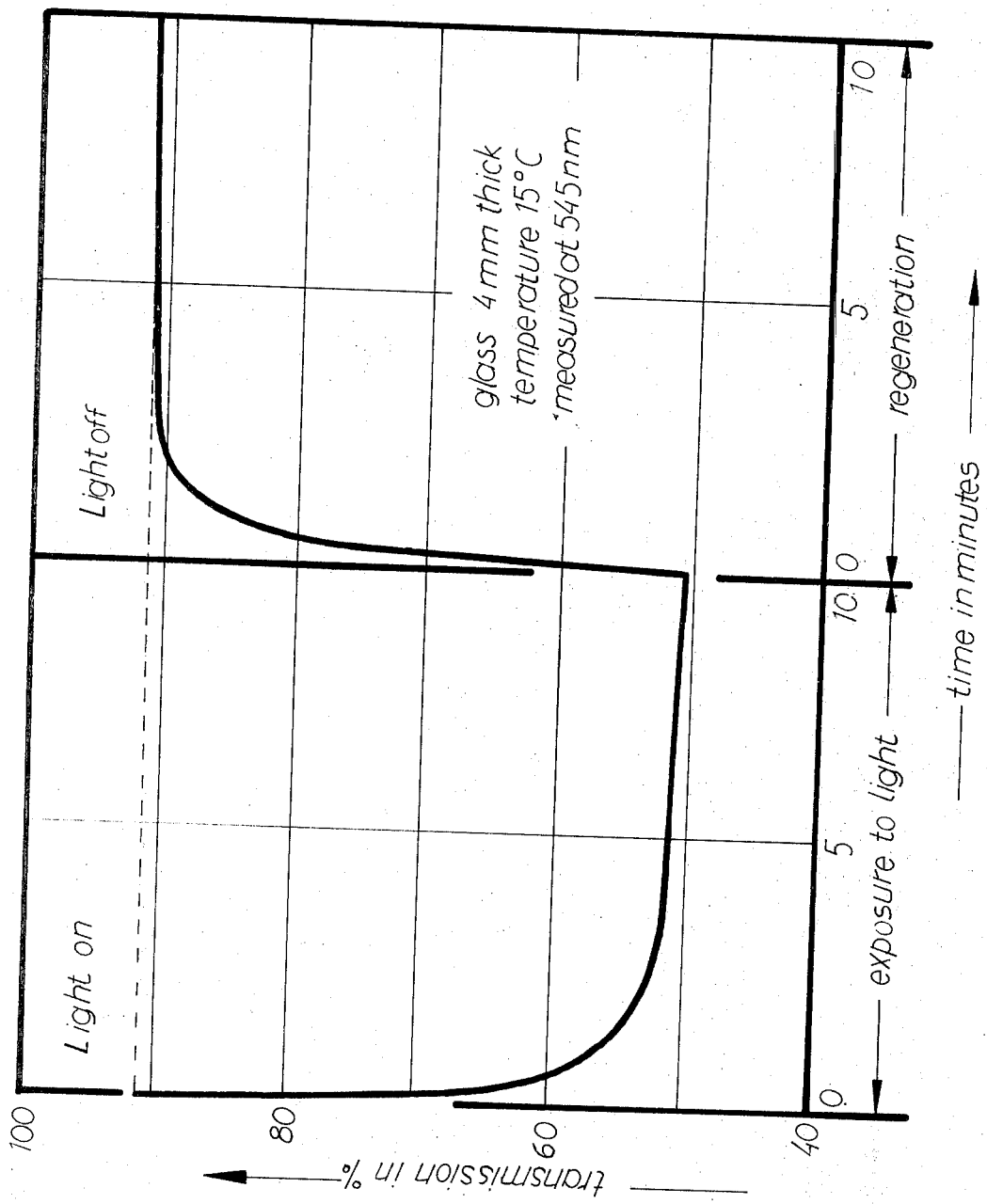

3,834,912
LEAD BORATE CONTAINING PHOTOTROPIC GLASS
Georg Gliemeroth, Mainz-Mombach, Germany, assignor to Jenaer Glaswerke Schott & Gen.
Continuation-in-part of abandoned application Ser. No. 685,596, Nov. 24, 1967. This application Feb. 24, 1971, Ser. No. 118,513
Claims priority, application Germany, Dec. 24, 1966, J 32,618
Int. Cl. C03c 3/14, 3/26, 3/30
U.S. Cl. 106—47 R      5 Claims

ABSTRACT OF THE DISCLOSURE

Phototropic glass compositions are disclosed, the phototropic properties of which are due to the presence in the composition of silver halide or mixed silver and silver halide crystals. The oxide forming glass composition has oxide bonds which are weaker than the bonding in a silicate base glass where $SiO_2$ is the principal glass forming component. The glass composition, i.e., the base glass into which the silver halide is incorporated, can consist entirely of boric oxide as glass former, but preferably has the following composition:

| | Weight percent |
|---|---|
| Boric oxide | 13.5–100 |
| Alkaline earth metal oxide | 0–40 |
| Alkali metal oxide | 0–21 |
| Silica | 0–10 |
| Zirconium oxide, aluminum oxide and/or zinc oxide | 0–25 |
| Lead oxide (when boric oxide content is up to 48 weight percent) | 29–73 |

This application is a continuation-in-part of application Ser. No. 685,596, filed Nov. 24, 1967, now abandoned.

The invention relates to a phototropic glass composition, the phototropic properties of which are produced by silver halide crystals possibly together with small amounts of metallic silver.

Attempts to produce a transparent material whose spectral transmittance is reversibly variable according to the amount of light and the wavelength of the light that passes therethrough have led, in the field of organic chemistry, to the provision of phototropic materials which are particularly distinguished by the great rapidity with which the phototropic process of darkening and brightening (regeneration) takes place. Most organic materials, however, do not have sufficient long-term stability of the phototropic effect, that is, after a period of time the degree of darkening (reduction of transmittance) produced by a given brightness and wavelength of light within a given time diminishes steadily.

In the case of inorganic glass compositions, however, long-term stability of the phototropic effect is assured, but in the organic glasses the darkening and regeneration rate is substantially less than in organic materials.

All of the inorganic phototropic glasses that have become known up until now consist of silicate glass into which the carriers of the phototropic process are incorporated. It is noteworthy that in the *known phototropic silicate glasses,* the principal component, silica, can be varied only within limits of 40 to 76% by weight, and the use of lower silica concentrations appears to be entirely inoperative.

Since the publication of R. W. Pohl's work in Physiker Zeitschrift *39,* (1938) 36–54, additional agents for carrying out phototropic process and other photochemical reactions have been discovered, these being mainly the silver halide crystals, AgCl, AgI and AgBr.

The known processes for the manufacture of phototropic glass are based on incorporating the phototropic components such as silver halide crystals or other crystalline silver salts chemically into the basic silicate glass by adding the same in appropriate form to the silicate glass batch before it is melted, and then precipitating them in the crystalline form in which they act as phototropic materials. The precipitation is carried out on the basis of procedures analogous to those used in the known high temperature color producing processes. Thus just as selenium ruby glass is made by precipitating the selenium-containing phase in colloidal form to produce the color, so the crystalline silver halides are precipitated as phototropic carriers in phototropic silicate glasses.

It is also known that successful attempts have been made to use *sensitizers* and other such additives for the purpose of affecting the speed and intensity of the darkening effect in phototropic silicate glass. It is further known that the glass may also contain small amounts of elemental silver. It is furthermore known that the phase separation in the glass has an influence on the phototropic effect but this has not as yet been precisely explained, and in the known studies on phototropy in glass it is taken for granted.

In spite of the proposals that have been made for the use of various sensitizers, it has hitherto been impossible to achieve in inorganic glass compositions a darkening and regeneration rate such as that found in organic phototropic materials.

It is, therefore, an object of this invention to provide a phototropic glass whose phototropic properties are determined by silver halide crystals, possibly in admixture with small amounts of metallic silver, in which a darkening and regeneration rate at least equivalent to that associated with organic phototropic materials is achieved.

It is a further object of this invention to provide a method for producing phototropic glass compositions, the phototropic properties being imparted thereto by silver halide crystals, possibly in admixture with small amounts of metallic silver, which can be carried out in a simple and economically feasible manner.

These and other objects are achieved in accordance with the invention by the provision of glass compositions comprising one or more glass-forming oxides as the principal component, the oxide bonds of which are weaker than the bonding in a silicate base glass where $SiO_2$ is the principal glass-forming component and a silver halide or mixture of silver halide and metallic silver.

It has been found, in accordance with the invention, that excellent phototropic glasses are formed of fused boric oxide alone which contain small amounts of silver halides or silver mixed with silver halides as phototropy carriers, and which may also contain small amounts of copper oxide as sensitizer. It is preferred that the molten compositions are rapidly chilled so as to produce, albeit though only under difficult conditions, a glass which is excellently phototropic. The darkening and regeneration rate, which shall be referred to hereafter as the phototropic process rate, is substantially greater in the glass of this invention than in the known silicate glasses, and is on the same order as that which is observed with the organic materials.

Although boric oxide glasses have excellent phototropic properties, pure boric oxide has very poor chemical stability. This poor chemical stability coupled with the cooling process which presents considerable technical difficulties makes the single-component $B_2O_3$ glass system not as good for technical applications as would be desired. It is, therefore, preferred to employ multi-component systems in which $B_2O_3$ is one of the components.

Generally, all combinations of glass-forming oxides, which produce a structure in which the oxide bond is weaker than that of the known silicate glasses have better kinetics as regards phototropic effect than do the silicate glasses. Instances of preferred glass systems include $B_2O_3$-PbO-$Al_2O_3$, $B_2O_3$-alkaline earth oxides-$Al_2O_3$ and intercombinations hereof.

A generic composition which defines the glasses of this invention is:

| | Weight percent |
|---|---|
| Boric oxide | 13.5–100 |
| Lead oxide | 0–73 |
| Magnesium oxide | 0–17 |
| Zirconium oxide | 0–12 |
| Zinc oxide | 0–12 |
| Borium oxide | 0–17.3 |
| Strontium oxide | |
| Calcium oxide | 0–3.7 |
| Aluminum oxide | 0–14.5 |
| Silica | 0–10 |
| Total alkaline earth metal oxides | 0–40 |
| Total alkali metal oxides | 0–21 |
| Total zirconium, aluminum and zinc oxides | 0–25 |

In accordance with the invention, it has been found that one particularly suitable glass composition for use in phototropic applications comprises at least 48 weight percent boric oxide; up to 40 weight percent alkaline-earth oxide; up to 12 weight percent of alkali metal oxide. For example $Na_2O$, $K_2O$, $Li_2O$ and possibly $Rb_2O$ and $Cs_2O$; and/or up to 25 weight percent PbO and/or $Al_2O_3$ and/or ZnO.

Another subgeneric glass composition which contains boric oxide and has excellent phototropic properties additionally contains lead oxide as a glass-forming component. In this alternative composition, the boric oxide content is preferably between 14.2 and 48 weight percent; the lead oxide content is between 29 and 73 weight percent; the alkaline-earth metal oxide content is in total 0–15 weight percent; alkali metal oxides content, i.e., $Na_2O$, $K_2O$, $Li_2O$ and occasionally $Rb_2O$ and $Cs_2O$ is 0 to 8 weight percent; and $ZrO_2$ and/or $Al_2O_3$ and/or ZnO are present in a maximum concentration of 23 weight percent.

Still another subgeneric glass composition for use in the improved phototropic glasses of this invention is the combination of boric oxide and alkali metal oxide. In this composition the alkali metal oxide is present in a proportion of 2 to 21 weight percent with the remainder boric oxide.

The amount of $Ag_2O$ and also the amount of silver halide which are required to impart to the base glass the desired phototropic effect can be varied within wide limits. The amount of halogen, i.e., Cl, Br, and I singly or in combination, must amount to at least about 0.02 weight percent. The amount of $Ag_2O$ required for realizing a phototropic effect must be at least about 0.09 weight percent.

Particularly satisfactory phototropic darkening and regeneration is realized with about 0.2–0.5 weight percent $Ag_2O$ and with about 1.5–4.0 weight percent Cl, Br, and I singly or in combination.

Larger quantities of $Ag_2O$ of up to about 1.0 weight percent and of the halogen, i.e., up to about 6.5 weight percent, can be used. However, the preparation of clear glass with such larger quantities is difficult and without special measures, the resultant glass is rendered cloudy by visible crystallization.

A suitable glass of the present invention is one wherein the glass forming oxide is lead borate. Phototropic glass of the present invention includes glass compositions having a boric oxide content greater than 45 weight percent, an alkaline earth metal oxide content between 10 and 44 weight percent and an alkali metal oxide content between 2 and 15 weight percent. Particularly desirable phototropic glasses are those containing boric acid in an amount up to 45 weight percent, an alkaline earth metal containing between 0 and 15 weight percent and an alkali metal oxide content of 0 to 8 weight percent.

CuO in a concentration of 0 to 0.8 weight percent and/or $Cr_2O_3$ in a concentration between 0 and 0.05 weight percent have been found to be suitable as sensitizers.

The $Ag_2O$ can be introduced into the glass batch as $AgNO_3$ or as $Ag_2O$ or in admixture with any or all of AgI, AgBr and AgCl. The halides can be introduced into the glass batch as the corresponding silver compound, i.e., as AgI, AgBr or AgCl or in the form of an alkali halide, i.e., KBr, KI, KCl, NaBr, NaI, etc.

In the following table, there are listed compositions for particular phototropic borate glass batches, the components being given on a basis of percent by weight.

TABLE

| | A | B | C | D | E | F |
|---|---|---|---|---|---|---|
| $B_2O_3$ | 14.9 | 81.4 | 47.8 | 71.0 | 67.5 | 73.6 |
| PbO | 69.4 | | 35.6 | | | |
| MgO | | | | 15.4 | 13.5 | |
| BaO | | | | | 15.4 | |
| ZnO | 9.90 | 10.2 | | | | 9.20 |
| $Al_2O_3$ | 1.98 | | 12.5 | 9.60 | | |
| $Na_2O$ | 0.10 | | | | | |
| $K_2O$ | | 5.08 | | | | 7.40 |
| KCl | | | | 0.48 | | 0.92 |
| KBr | 1.49 | 1.53 | 1.44 | 1.44 | 1.45 | 1.38 |
| KI | 1.49 | 1.53 | 1.44 | 1.44 | 1.45 | 1.38 |
| LiF | 0.50 | | 0.96 | 0.29 | 0.29 | 0.28 |
| $Ag_2O$ | 0.19 | 0.30 | 0.29 | 0.38 | 0.38 | 0.37 |
| CuO | 0.005 | | 0.01 | | 0.02 | 0.02 |
| $K_2Cr_2O_7$ | | | | 0.01 | 0.005 | 0.01 |
| $ZrO_2$ | | | | | | 5.52 |

In accord with a further aspect of this invention, $SiO_2$ can be incorporated into the glass as a subordinate glass component in an amount of up to about 10 weight percent and results in the formation of a glass having a much stronger structure. However, the rate at which such a glass composition darkens and regenerates is much slower than that of a composition which does not contain $SiO_2$.

The glass formula, accordingly, must be optimized according to the application involved.

The following example is given for the purpose of illustrating the method of making the glass compositions of the invention.

EXAMPLE

A phototropic glass can be manufactured, for example, by first mixing together the following components:

| | Grams |
|---|---|
| $AgNO_3$ | 34 |
| CuO | 1.25 |
| $K_2Cr_2O_7$ | 0.62 |
| $ZrO_2$ | 346 |
| ZnO | 576 |

This part of the batch is ground dry for 1 hour in a porcelain ball mill for better homogenization and is then mixed with the rest of the batch components mechanically by means of mixers of prior-art design, the said components being:

| | Grams |
|---|---|
| $H_3BO_3$ | 8119 |
| $K_2CO_3$ | 677 |
| KCl | 57 |
| KBr | 86 |
| KI | 86 |
| LiF | 18 |

The ten-kilogram batch thus prepared is placed in a glass melting container at 1300° C. and melted for 2 hours at 1250° C. Thereafter, the glass was clarified for 1 hour at 1270° C. It was then removed from the glass melting container and cooled in a stress-free manner.

The cooling process was interrupted at 450° C. for 13 hours, during which time the temperature was kept at 460° C. The cooling was then continued down to room temperature.

The formation of silver halide crystals is achieved by interruption of the cooling process at a temperature within the range of 420–630° C. for a period of 10–16 hours, during which time the temperature is maintained constant at the temperature at which cooling was interrupted. Thereafter, cooling is continued down to room temperature.

When cooling is interrupted at a lower temperature, longer periods of time are necessary for development of the silver halide crystals. Conversely, interruption at a higher temperature requires shorter interruption times. If the waiting time is kept too long, or if the interruption takes place at too high a temperature, visible crystallization takes place. Too short an interruption time, or too low a temperature, imparts an insufficient degree of phototropicity to the glass. The growth of the silver halide crystals and the kinetics thereof correspond to the known high temperature color-producing processes on the basis of silenium ruby.

The glass compositions of the above table were prepared in a manner entirely analogous to that set forth in the above example.

The outstanding property of the resultant phototropic glass is its extraordinary reversible kinetic behavior in the phototropic process. This can be seen from the very rapid darkening and regeneration rate depicted in the drawing which forms a part of this application. The drawing specifically shows the kinetic phototropic behavior of a glass identified by the letter C in the table.

What is claimed is:

1. A phototropic glass composition comprising a phototropic agent selected from the group consisting of a silver halide and a mixture of silver halide and metallic silver and a glass composed of at least one glass forming oxide whose oxide bonds are weaker than the oxide bonds of $SiO_2$ which glass consists essentially of boric oxide in an amount between 14.2 and 48 weight percent, lead oxide in an amount between 29 and 73 weight percent, alkaline earth metal oxide in an amount between 0 and 15% weight percent, the combined amount of $Na_2O$, $K_2O$, $Li_2O$, $Rb_2O$ and $Cs_2O$ being between 0 and 8 weight percent, and the combined amount of $ZrO_2$, $Al_2O$ and ZnO being between 0 and 23 weight percent, the amount of silver calculated as $AgO_2$ being at least 0.09 weight percent and the amount of halogen being at least 0.02 weight percent.

2. A phototropic glass composition according to claim 1 wherein the amount of silver calculated as silver oxide is present in an amount between 0.09 and 1.0 weight percent and the chlorine, bromine or iodine combined content is between 0.02 and 6.5 weight percent.

3. A phototropic glass composition according to claim 1 wherein the silver is present in an amount between 0.2 and 0.5 weight percent calculated as $Ag_2O$ and the chlorine, bromine or iodine is present in an amount between 1.5 to 4.0 weight percent.

4. A phototropic glass composition according to claim 1 having the following composition:

| | Wt. percent |
|---|---|
| $B_2O_3$ | 14.9 |
| PbO | 69.4 |
| ZnO | 9.90 |
| $Al_2O_3$ | 1.98 |
| $Na_2O$ | 0.10 |
| KBr | 1.49 |
| KI | 1.49 |
| LiF | 0.50 |
| Silver calculated as $Ag_2O$ | 0.19 |
| CuO | 0.005 |

5. A phototropic glass composition according to claim 1 having the following composition:

| | Wt. percent |
|---|---|
| $B_2O_3$ | 47.8 |
| PbO | 35.6 |
| $Al_2O_3$ | 12.5 |
| KBr | 1.44 |
| KI | 1.44 |
| LiF | 0.96 |
| Silver calculated as $Ag_2O$ | 0.29 |
| CuO | 0.01 |

References Cited

UNITED STATES PATENTS

| 2,511,228 | 6/1950 | Sun et al. | 106—47 Q |
| 3,061,664 | 10/1962 | Kegg | 106—53 |
| 3,548,060 | 12/1970 | Suzuki et al. | 106—Dig. 6 |
| 3,328,182 | 6/1967 | Araujo et al. | 106—Dig. 6 |
| 3,208,860 | 9/1965 | Armistead et al. | 106—Dig. 6 |
| 3,594,198 | 7/1971 | Sperry | 106—54 |

OTHER REFERENCES

Morey, G. W., "The Properties of Glass," pp. 203 and 373, Reinhold Publishing Corporation (1954).

WINSTON A. DOUGLAS, Primary Examiner

M. L. BELL, Assistant Examiner

U.S. Cl. X.R.

106—Dig. 6, 47 Q, 54